United States Patent [19]
Chandler et al.

[11] Patent Number: 4,515,692
[45] Date of Patent: May 7, 1985

[54] WATER FILTER
[75] Inventors: James W. Chandler; William D. Chandler, both of Ashland, Ohio
[73] Assignee: Water Soft, Inc., Ashland, Ohio
[21] Appl. No.: 492,359
[22] Filed: May 6, 1983
[51] Int. Cl.³ .................. B01D 23/14; B01D 23/24
[52] U.S. Cl. .................. 210/278; 210/288
[58] Field of Search .................. 210/277–279, 210/288

[56] References Cited
U.S. PATENT DOCUMENTS
2,087,887 7/1937 Gesner .................. 210/278
3,707,233 12/1972 Lerner .................. 210/288
4,301,009 11/1981 Cook et al. .................. 210/278

Primary Examiner—Ivars Cintins
Attorney, Agent, or Firm—Maky, Renner, Otto & Boisselle

[57] ABSTRACT

A water filter adapted for installation in the hot and cold water supply lines leading to a faucet, appliance or the like includes a housing containing a granular activated carbon filtration bed and a two position valve with three ports for controlling water flow through the filtration bed. The valve has a first service position for normal flow of cold water through the filtration bed to the effluent line from the water filter and a second backwash position for flow of hot water through the filtration bed in an opposite direction to then drain through the same effluent line.

19 Claims, 7 Drawing Figures

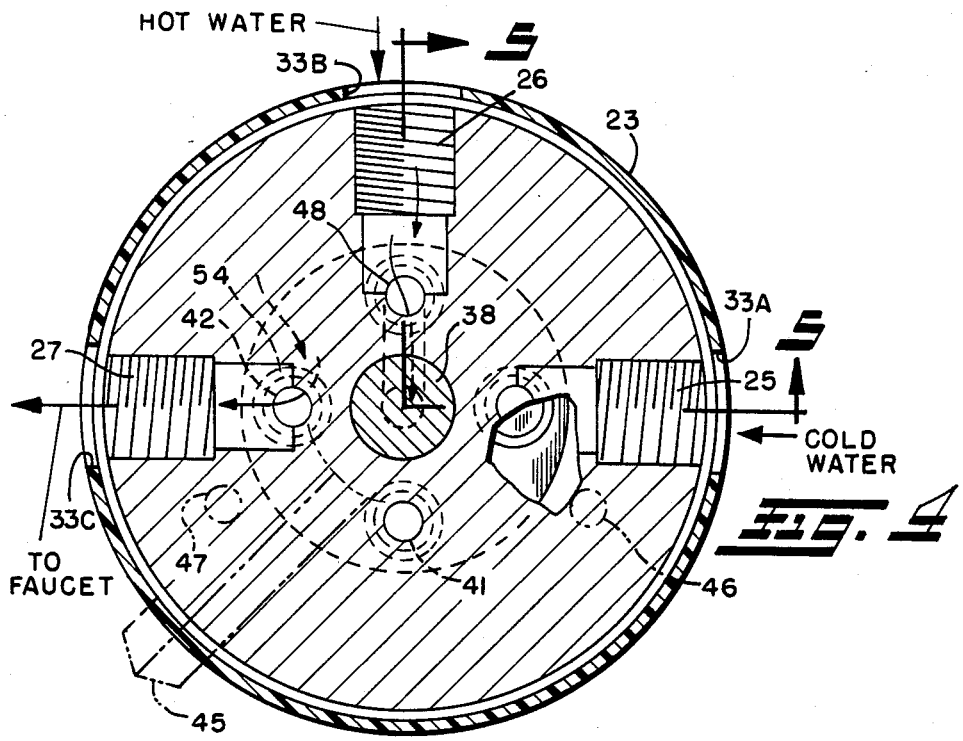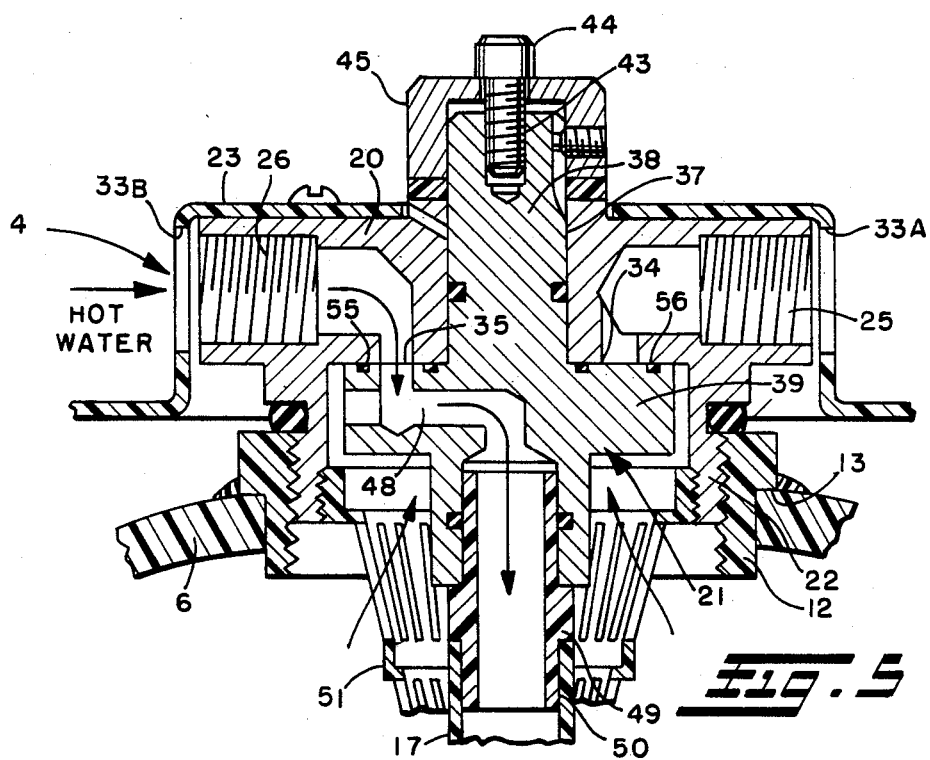

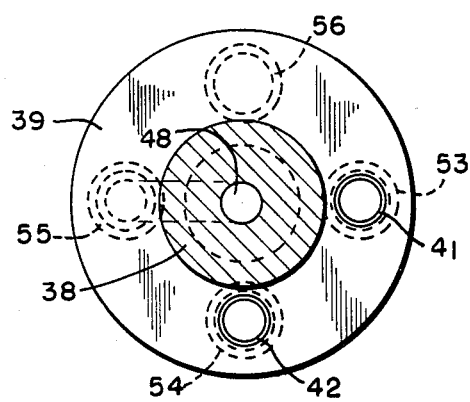
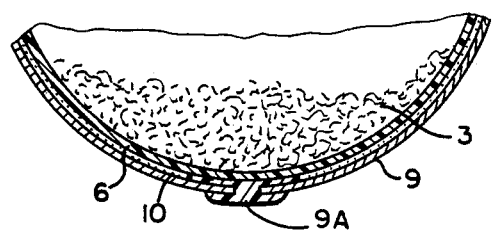

WATER FILTER

FIELD OF THE INVENTION

The present invention relates in general to a water filter for purifying cold water for human use and in particular to a water filter using an effluent line both as a service line for the purified cold water and as a backwash drain for hot water flowing in reverse direction through the filtration bed.

BACKGROUND OF THE INVENTION

Well water has natural chemicals and minerals therein which are undesirable for human consumption. Water provided from a centralized water treatment source has synthetic treatment chemical residuals and byproducts therein which are also undesirable for human consumption. The advantages of removing the undesired components of well water and centrally treated water have long been recognized, and several products are available for domestic use to assist in removing the undesirable components.

The most popular commercially available filtration product is a filtration cartridge attached to or made a part of the faucet. These filtration cartridges generally include mesh screens, paper filtration walls and a small quantity of activated carbon. These cartridges do provide some beneficial filtration results but are subject to certain limitations.

In this regard, the filtration cartridge has a limited life cycle, is inconvenient to use and has a limited filtration effect because of its small size and the relatively fast water flow rate through the same. With respect to the limited life cycle, the cartridge filters can remove many different bacteria from the water, with these bacteria then feeding on the organics present in the cartridge. This organic feeding allows the bacteria to live, grow and multiply in and on the screens and activated carbon of the cartridge. This bacteria colony count on the effluent side of the cartridge unit can rather quickly become high, particularly if the associated faucet remains idle for several days. These bacteria in the cartridge units may then be reintroduced into effluent water passing through and from the cartridge which is an undesirable result because of the potentially deleterious effect to humans and the reduction in quality of water obtained in any event. This phenomena of undesirable bacteria living and breeding in the cartridge filter system rquires the filtration cartridge to be frequently replaced for proper operation at added expense and inconvenience to the home owner. This inconvenience results from the necessity of shutting off the water, relieving the water pressure, removing the old cartridge, installing a new cartridge and restoring water service in order to replace an improperly functioning filtration cartridge. This inconvenience has the natural effect of making the homeowner less prone to change the cartridge filter and less likely to follow the cartridge filter manufacturer's recommendations as to frequency of change.

Another filtration system available is a product known as the Hurley Water System. This system includes a separate lined tank having an activated carbon filtration bed contained therein. The lined tank has a top water port and a bottom water port. In normal service use of the Hurley system, a filler hose extends from the faucet to the bottom port to force water up through the filtration bed and then through the upper port for use. The Hurley filtration bed can be backwashed by connecting the filler hose from the faucet to the top port. In the backwash mode, hot water passes through the filler hose, down through the filtration bed and then out the bottom port. The Hurley system has several advantages over the faucet filtration cartridges described above in that a larger activated carbon filtration bed is provided and the filtration bed can be backwashed. This backwashing with hot water removes some of the contaminants and bacteria remaining in the bed from previous use and reorients the granulated bed to reopen flow channels. However, the Hurley system is subject to several disadvantages.

In that regard, the Hurley system includes a separate lined tank which must be handled by the homeowner and must be positioned on a counter top for use taking away valuable counter top space and detracting from household aesthetics. Moreover, the use of the Hurley system requires the homeowner to make the hose manipulations and installations described above for both normal service use and for backwashing the filtration bed. The inconvenience of this manipulation and installation to the homeowner may make the homeowner less prone to backwash the filter with the frequency preferred.

SUMMARY OF THE PRESENT INVENTION

To overcome the disadvantages of the previous systems, the present invention includes a water filtration system that can be installed under the sink, can provide a relatively large activated carbon filtration bed and can provide the ability to backwash the filtration bed with hot water by merely changing a valve position without any plumbing changes. The valve incorporated into the housing of the present water filter has two positions and three ports. In the first service position, cold water enters through the cold water port, passes through the filter bed and exist through the effluent line leading to the faucet for human use. In the second backwash position, hot water enters the unit through the hot water port, flows through the filtration bed in an opposite direction and then passes through the effluent line to drain through the faucet. The water filter of the present invention allows the homeowner to merely shift the position of the valve to go between service and backwash functions and the effluent line from the filtration unit performs both as a service line and as a backwash drain line.

In view of the above, the principal object of the present invention is to provide a water filter unit that can be installed in the water lines leading to a sink faucet or appliance and that is adapted to purify cold water in a filter bed and to backwash the filter bed without plumbing changes being required.

It is another object of the present invention to provide a water filtration unit having a two position, three port valve to permit the homeowner to choose one position for filtering cold water and choose a second position for backwashing the filtration bed with hot water.

It is yet another object to provide a water filtration unit that utilizes the effluent line from the filter unit both as the filtered water outlet and as the backwash water drain.

It is still another object of the present invention to provide a water filter which is safe and easy to use in both service and backwash modes and provides a relatively large filter bed in an installation beneath a sink.

These and other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

DESCRIPTION OF THE DRAWINGS

In the drawings:

FIG. 3 is a horizontal cross section of the valve body as taken along the plane 3—3 in FIG. 2, with a portion of the valve body being broken away to show the cooperating valve disk;

FIG. 4 is a cross section of the valve body similar to FIG. 3 but showing the valve in the backwash position in which the valve disk has been indexed 90° relative to FIG. 3;

FIG. 5 is a vertical section taken along the plane 5—5 in FIG. 4 showing the flow of the hot water into the water filter unit in the backwash valve position, with the cold water port being closed;

FIG. 6 is a bottom plan view of the valve disk taken on the plane 6—6 in FIG. 1; and FIG. 7 is a partial section of the housing for the water filtration unit showing the details of the housing wall construction and insulation.

DESCRIPTION OF THE PREFERRED EMBODIMENT

Figure 1:
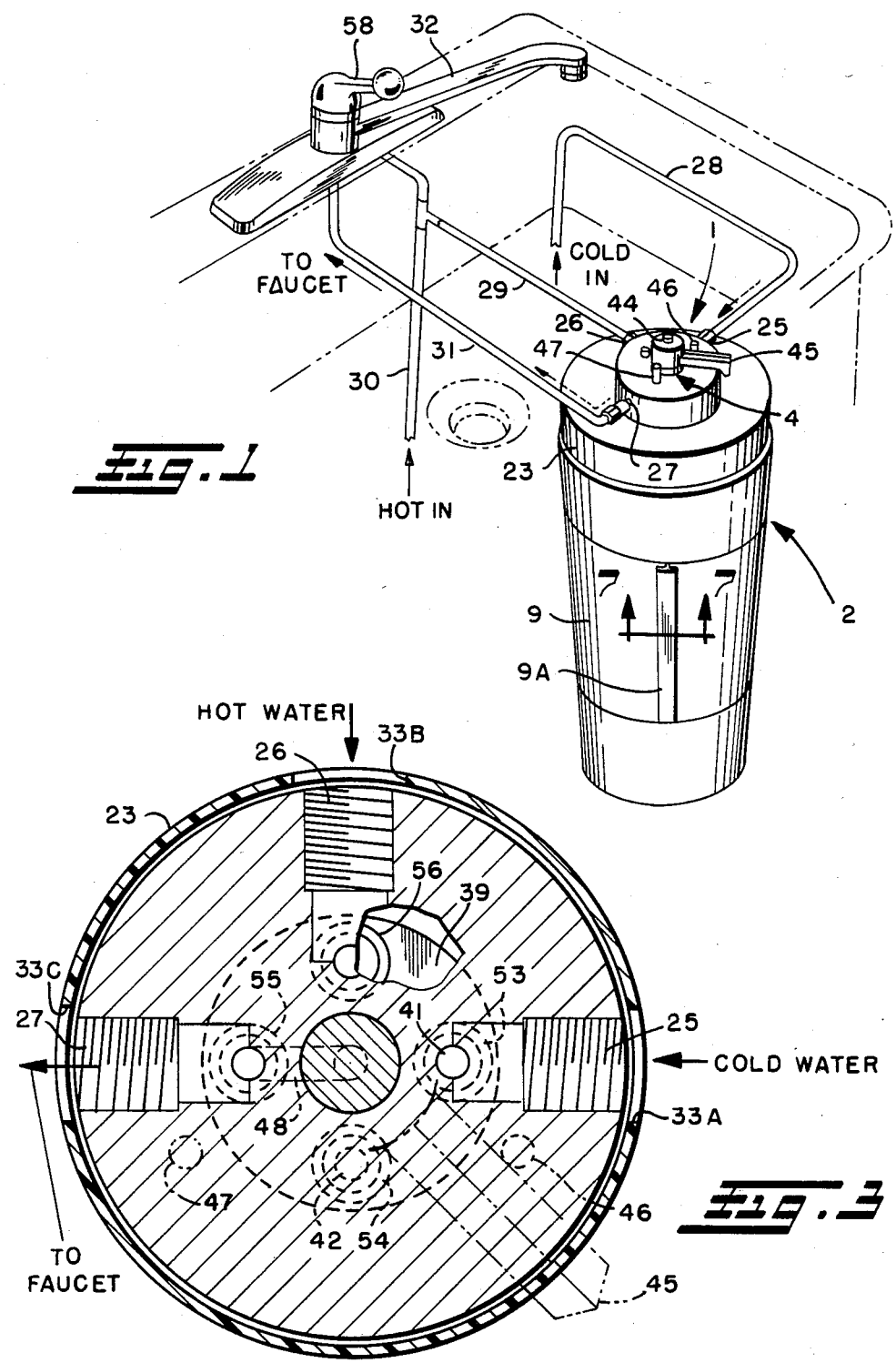
FIG. 1 is a schematic perspective showing the water filter of the present invention installed below a sink in the hot and cold water supply lines to the sink faucet.
Figure 2:
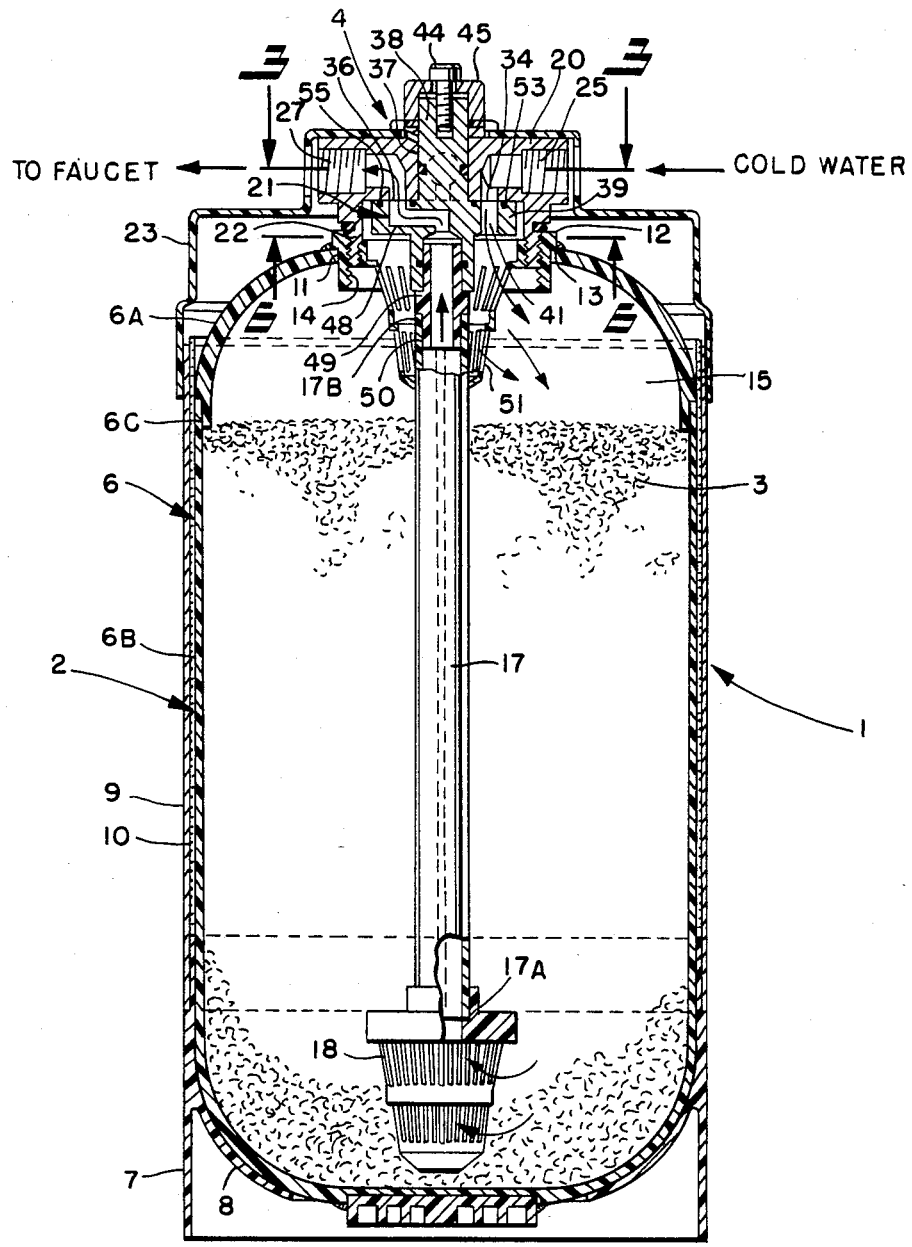
FIG. 2 is a vertical cross section of the water filtration unit showing the details of the valve structure, the riser tube associated with the valve structure and the filtration bed, with the valve being shown in its normal service position.

Referring now in more detail to the drawings and initially to FIGS. 1 and 2, the water filter unit indicated generally at 1 is adapted for installation under a sink as shown or alternatively for installation in appropriate plumbing lines at any other convenient location in a house, building or vehicle. However, the installation beneath the sink is preferred because this permits easy access to the unit for service and backwash operations by the homeowner or user.

The water filtration unit includes a housing indicated generally at 2, an activated carbon filter bed 3 and a valve, indicated generally at 4. The valve 4 encloses the top of the housing and controls the flow of water through the housing and filter bed contained therein. The water filter unit of the present invention will be described herein by detailed explanations of the housing 2, filter bed 3 and valve 4, followed by a detailed description of the installation and operation of the water filter unit.

Water Filter Housing 2

The housing 2 includes a hollow fiberglass wound tank 6 containing the filter bed 3. This tank 6 is formed by connecting a fiberglass wound top 6A to a fiberglass wound base container 6B, with the permanent connection therebetween being shown as 6C. The tank 6 has its inner surface completely covered with an ABS liner. In the preferred embodiment, the tank 6 is approximately nine inches in diameter and has an overall height of approximately 17 inches.

The tank 6 has a base 7 which receives the lower end of such tank. The base 7 has an annular arcuate flange 8 positioned beneath and supporting the tank 6. The base 7 supports the tank in an upright position and permits the water filter unit 1 to be conveniently stored and/or displayed.

In conjunction with the display function, a decorative outer plastic sheet 9 is held in cylindrical form by an H channel joining strip 9A. The plastic sheet 9 fits over the tank 6 and is supported by the base 7. The plastic sheet 9 may have a layer of insulation 10 bonded to its inner surface to improve the thermal efficiency of the water filtration unit. The decorative plastic sheet 9 provides a finished look to the unit, and the outer surface thereof may be used for customer information and identication.

The top of the tank 6 has an aperture 11 therein which receives a collar 12. The collar 12 has a lip 13 which bears against the upper surface of the tank and has a threaded internal diameter 14. The collar 12 is secured to the tank 6 and provides an opening for filling the hollow compartment 15 of tank 6 with the activated carbon filter bed 3.

Activated Carbon Filter Bed 3

The filter bed 3 preferably consists of granular activated carbon which substantially fills the entire compartment 15 of tank 6 as shown by the level in FIG. 2. With the preferred tank dimensions recited above, approximately eight pounds of activated carbon may be inserted in the tank 6. The quantity of the activated carbon present and the depth of the filter bed provides for sufficient contact time between the water and carbon to provide the desired filtering effect for normal water flow rates of approximately three gallons per minute through the filter bed.

For best operation, the granular activated carbon is made from a select grade of coal which is milled, compacted, sized and thermally steam activated to yield a strong dense product with large surface area. The pore structure is controlled throughout the activation process so that the activated carbon can absorb organic impurities in the water and also dechlorinate the water. The particle size distribution of the carbon granules is also selected to act as a mechanical filter to remove suspended solids from the water during water passage through the bed 3. The water flow through the bed is either initiated or terminated by water flow through a riser or distributor tube 17.

As best shown in FIG. 2, the riser tube 17 is substantially entirely embedded in the filter bed 3. The riser or distributor tube 17 is preferably 13/16 inch in diameter for the preferred dimensions given for the filtration unit. The lower open end 17A of the riser tube 17 is covered by a plastic slotted basket 18 secured thereto. The upper end 17B of the riser tube 17 is above the level of the filter bed 3 and is coupled to the valve 4.

Two Position Valve 4

The valve indicated generally at 4 includes a valve body 20 and a valve disk indicated generally at 21. The valve body has a downwardly depending externally and internally threaded annular skirt 22. The outer threads on skirt 22 mate with the female threads 14 on collar 12 when the valve 4 is screwed onto and held by the tank 6. The valve 4 is preferably covered by a decorative plastic cap 23 contoured to enclose the valve 4 and slide over the top of the plastic housing cover 9.

The valve body 20 includes a first internally threaded port 25, a second internally threaded port 26 and a third internally threaded port 27, with these ports being spaced from one another in 90° circumferential increments as best shown in FIG. 3. The first port 25 threadably receives a coupling on the end of the cold water supply line 28. The second port 26 in valve body 20 threadably receives a coupling on the end of a branch line 29 leading from the hot water supply line 30. The third port 27 in valve body 20 threadably receives a coupling on the end of an effluent line 31 leading from the water filter unit 1 to the cold side of faucet 32. The decorative cover 23 is provided with three apertures, 33A–33C providing plumbing access to the three ports in the valve body. The three ports 25, 26 and 27 fluidically communicate with flow openings 34, 35 and 36, respectively, in the bottom surface of the valve body 20.

The valve body includes a central bore 37 which rotatably receives the spindle 38 on valve disk 21. The spindle 38 is integrally formed with an annular flow control flange 39 extending outwardly therefrom. The flow control flange 39 of valve disk 21 has two flow passages 41 and 42 therethrough, with such passages being spaced 90° apart. These passages 41 and 42 in the valve disk flange selectively cooperate with the valve port openings in the valve body by indexing movement of the valve disk.

To this end, the upper end of the valve disk spindle 38 has a tapped hole 43 therein threadably to receive the shank of a fastener 44 securing a handle 45 to the spindle 38. This handle 45 can be moved in a 90° arc concurrently to index the valve disk 21 through a similar 90° arc. Two spaced stop pins 46 and 47 extend upwardly from the top of cover 23 to limit the arcuate movement of handle 45. These stop pins 46 and 47 are positioned 90° apart and are located to provide accurate indexing of the valve disk 21 relative to the valve body 20 with which it cooperates.

The lower end of the valve spindle 38 has a curved flow passage 48 leading from its lower central end through two 90° bends to an opening in the valve disk flange 39 adjacent the bottom of the valve body 20. An adapter 49 is secured to the valve disk spindle 38 in the passage 48, and this adapted slidingly receives and frictionally engages the upper open end of riser tube 17 as shown at 50. The curved passage 48 in valve disk 21 thus fluidically communicates with the riser tube 17. The upper end of the riser tube 17 is surrounded by a plastic slotted basket 51 which has an upper lip threadably secured to the internal threads on the skirt 22 of valve body 20. This upper slotted basket 51 thus extends between the riser tube 17 and valve body 20 to cover the valve disk 21, with this slotted basket performing different functions in the two operational modes of the water filter unit.

Installation and Operation of the Water Filter Unit 1

The water filter unit 1 is initially installed in the hot and cold water supply lines as described above. As mentioned, this installation is preferably beneath the sink for convenience to the user of the water filter unit. The top 23 of the filter unit is provided with indicia adjacent the handle 45. At one extreme of handle movement against stop pin 46, the indicia defines the normal service mode for the water filter unit, while in the other position of the handle against stop pin 47, the indicia defines the backwash mode for the water filter unit.

In the service mode of the handle 45, the valve disk 21 is positioned so that the cold water port opening 34 is in alignment with the passage 41 in valve disk 39, the hot water port opening 35 is closed by the valve disk flange and the curved spindle passage 48 is in alignment with the effluent port opening 36. The two passages 41 and 42 through the valve disk flange 39 are respectively surrounded by seals 53 and 54 embedded in the upper surface of the valve disk flange 39. The upper opening of curved passage 48 is surrounded by an O-ring seal 55 embedded in the upper surface of the valve disk flange 39, and a fourth O-ring seal 56 is embedded in the upper surface of valve disk flange 39 diametrically opposite the O-ring seal 54 around passage 42. As best shown in FIGS. 3 and 6, O-ring 56 does not surround any opening in the valve disk flange, and the blank face thereof closes the hot water port 26 in the service mode of the water filter unit. The O-rings 53 through 56 provide a water tight seal between the valve body 20 and valve disk 21 to permit water flow therethrough and thereagainst without leakage.

In the service mode, cold "raw" water flows through supply line 28, port 25, valve body opening 34, valve disk passage 41 into chamber 15 of tank 6. The cold water entering tank 6 passes through the upper slotted basket 51. This slotted basket acts as a primary turbidity filter to catch and retain large dirt, rust and/or silt particles, thereby to remove the same from the water entering the filter bed. The water then passes downwardly through the granular activated carbon filtration bed 3. This downward water flow through the bed 3 will trap and remove additional sediment from the water and will also absorb undesired chemicals, minerals and other contaminants from the water. For example, the filter bed 3 can remove and adsorb some or all of the following undesired components of raw cold water: residual iodine and chlorine, herbicidal and pesticidal compounds, ferric iron, hydrogen sulphide gas, color, turbidity, offensive tastes and/or odors, and trihalogenated byproduct compounds. The filter bed 3 will not remove hardness in the water nor will it remove the beneficial flourides that many municipal water systems inject into their treated water.

The thus filtered water then flows through the lower slotted basket 15 and up the riser or distributor tube 17. The lower slotted basket 18 retains the activated carbon in place and keeps the opening of the riser tube 17 clear to allow the filtered or purified water to pass upwardly therethrough. This filtered water then flows through curved passage 48 in the valve disk 21 and the third effluent port 27 in valve body 20. This filtered and treated cold water then passes through effluent line 31 to the cold side of the faucet 32. With this filtration unit, the cold water is filtered and treated since it has been determined that cold water is used for most human consumption and use purposes.

After a predetermined period of normal service use, the user must backwash the filter bed 3 to regenerate the same for efficient filtration. To do this, the user merely moves the handle 45 from the service position through a 90° arc to the backwash position against stop 47. This indexes the valve disk flanges 21 through a coextensive 90° arc to change the porting of the water filter unit. In the backwash mode, as best shown in FIG. 4, the curved passage 48 of valve disk 21 is in alignment with the hot water port opening 35 and the passage 42 in the valve disk flange 26 is in alignment with the effluent port opening 36. The cold water port 25 and the opening thereof are closed by the face of the valve disk flange 39 inside the seal 56, as shown in FIG. 5.

In the backwash mode, the faucet handle 58 is turned on in its normally "cold" position, but hot water enters the unit 1 from the branch line 29. This hot water enters the hot water port 26 in valve body 20 and then flows through curved passage 48 in valve disk 21. The hot water then moves downwardly through the distributor tube 17 and is sprayed into the bottom of the filtration bed 3 by passing through the slots in the lower slotted basket 18.

The hot water is then forced upwardly through the filter bed 3 by the system water pressure and thus moves through the filter bed in a direction opposite to the direction of water flow in the service mode. This flow of hot water upwardly through the filter bed 3 raises or floats the activated carbon granules, but such granules are retained in the tank 6 by the slotted basket 51. By raising or floating the granules, trapped sediment is removed from the bed by the hot backwash water, and the granules are redistributed and cleaned to improve water flow through the bed and increase surface availability and reactivity. Moreover, the hot water used for backwashing shocks, kills and/or removes many of the bacteria that may have collected in the carbon bed.

The hot water finally passes upwardly through valve disk passage 42 and effluent port 27 into effluent line 31. The hot water moving through effluent line 31 then passes through and from the faucet 32 carrying the contaminants removed from the filter bed in the backwash operation. The aerator screen at the end of the faucet 32 is preferably removed for the backwashing operation. The faucet thus acts as a drain in the backwashing mode for sink disposal of the backwash water with contaminants contained therein. The hot water moving through the faucet also has a cleansing effect on the same.

After backwashing with hot water for approximately eight to ten minutes, the handle 45 should be returned to the service position to complete the backwashing operation. By doing this, cold water again enters the filter bed 3 to settle and cool the same for normal use. After approximately four to five minutes of cold water flow, the faucet handle 58 is turned off and the aerator screen is reinstalled on the end of the faucet. The water filter unit and filtration bed contained therein are then ready for normal service use.

It will be apparent from the foregoing that changes may be made in the details and construction and configuration without departing from the spirit of the invention as defined in the following claims. For example, the filter unit 1 of the present invention may occasionally be installed where hot water is not readily available, such as in a boat or vacation cabin. In such case, the incoming cold water line may be provided with a fitting to run a branch cold water line to second inlet port 26. The filter bed could then be backwashed with cold water to remove trapped sediment and contaminants and to reorient the bed. When cold water is used for backwashing, the backwash cycle should be run for approximately fifteen minutes followed by one minute of service flow to settle the bed before returning the filtration unit to service.

As another exemplary change within the scope of the present invention, the effluent line 31 may lead to a water demanding appliance, such as an ice maker. In such case, a diverter valve to drain would be installed between the filtration unit and the appliance. In the backwash mode of the filtration unit, the diverter valve would be opened to direct the hot backwash water to a drain rather than to the appliance.

Other exemplary changes within the scope of the invention relate to alternative but unpreferred plumbing installations. For example the water filter unit could also be installed in a hot water line and a hot water branch line to filter hot water and also to backwash with hot water. The final remote and perhaps impractical plumbing option would be to install the unit so that hot water is filtered and cold water is used to backwash.

I claim:

1. A water filter adapted to have water move therethrough comprising a housing containing a filtration bed and valve means having three ports only mounted on said housing to control water flow through the housing and filtration bed, said valve means having a first inlet port, a second inlet port and a third effluent port, said valve means being movable between two positions, the first position of the valve means directing water through the first inlet port, through the filtration bed in a first direction and then through said effluent port to provide filtered water for use and the second position of the valve means directing water through the second inlet port, through the filtration bed in a second opposite direction and then through said effluent port for drainage.

2. The water filter set forth in claim 1 wherein the valve means includes a valve body and a movable valve disk cooperating with said valve body.

3. The water filter set forth in claim 2 wherein the valve body has three ports and a central bore, and the valve disk has a central spindle rotatably received in said central bore and an annular flange abutting said valve body.

4. The water filter set forth in claim 3 further including a riser tube embedded in and emerging from said filtration bed, the emergent end of said riser tube being coupled to the internal end of the valve disk spindle.

5. The water filter set forth in claim 4 wherein the valve disk has first and second passages extending through the flange and a third curved passage extending from the valve disk spindle and riser tube to the outer flange surface abutting the valve body.

6. The water filter set forth in claim 5 wherein the first port is connected to and in the cold water line, the second port is connected to a branch of the hot water line, and the third port constitutes said effluent water port, whereby the first position of the valve means filters cold water for service and the second position of the valve means directs hot water through the filtration bed for backwashing.

7. The water filter set forth in claim 6 further comprising control means connected to the outer end of the valve spindle movably to index the valve spindle between a first position corresponding to the first position of the valve means and a second position corresponding to the second position of the valve means.

8. The water filter set forth in claim 7 wherein, in the first position of the valve disk, the first passage in the valve disk flange registers with the first valve body port to permit cold water to pass downwardly through the filtration bed, the second valve body port is closed, and the third curved passage in the valve disk registers with the third effluent port to permit the filtered water rising through the riser tube to pass through said effluent water port.

9. The water filter set forth in claim 7 wherein, in the second position of the valve disk, the first valve body port is closed, the third curved passage in the valve disk registers with the second port to pass hot water down through the riser tube and then upwardly through the filtration bed, and the second passage in the valve disk flange registers with the third port to pass the hot water rising upwardly from the filtration bed through said effluent water port.

10. The water filter set forth in claim 5 wherein an upper slotted basket is positioned between the riser tube and the housing to cover the valve disk with a slotted surface, and a lower slotted basket positioned about its lower end to cover the lower open end of the riser tube with a slotted surface.

11. The water filter set forth in claim 1 wherein the filtration bed is granular activated carbon, the housing is a fiberglass wound tank with an ABS liner, and a sheet of insulation is wrapped around the tank.

12. A water filter adapted to be installed in separate cold and hot water supply lines comprising a housing containing a granular activated carbon filtration bed, valve means on said housing to control water flow through said filtration bed, said valve means including a valve body and a movable valve disk cooperating with said valve body, said valve body having three ports only, the first port being adapted for connection to and positioning in said cold water supply line, the second port being adapted for connection to a branch of the hot water supply line and the third port being adapted for connection to an effluent water line leading from the housing, said valve disk having flow control means therein selectively cooperating with said three ports to permit cold water from the cold water line to flow through the filtration bed in one direction and then out the effluent water line when said valve disk is in a first position for service and alternatively to permit hot water from the hot water branch to flow through the filtration bed in an opposite direction and then out the effluent water line when said valve disk is moved to a second position for backwashing.

13. The water filter set forth in claim 12 wherein said flow control means includes a handle on said valve disk adapted to index the valve disk between the first service position and the second backwash position.

14. The water filter set forth in claim 13 wherein the valve disk has a plurality of passages therein selectively registering with the valve body ports when the valve disk is indexed to provide the flow defined for the two positions of the valve disk.

15. The water filter set forth in claim 14 further comprising a riser tube generally centrally embedded in the filtration bed and extending upwardly therefrom fluidically to communicate with one of the passages in the valve disk.

16. The water filter set forth in claim 15 further comprising an upper slotted basket positioned between the upper extended end of the riser tube and the housing and a second slotted basket positioned about the lower embedded end of the riser tube.

17. The water filter set forth in claim 15 wherein the valve disk is sealed to the valve body to preclude water leakage therebetween.

18. The water filter set forth in claim 12 wherein the water filter is installed under a sink having a faucet and said effluent water line leads to said faucet.

19. The water filter set forth in claim 12 wherein said effluent line leads to a water demanding appliance and a diverter valve is installed in said effluent water line between said water filter housing and said appliance to divert hot water used for backwashing to a drain rather than to said appliance.

* * * * *